United States Patent
VanLaningham et al.

(10) Patent No.: US 7,898,479 B1
(45) Date of Patent: Mar. 1, 2011

(54) SYSTEM AND METHOD FOR SIGNAL EXTRACTION AND ANGLE OF ARRIVAL DETERMINATION

(75) Inventors: Steven VanLaningham, Richardson, TX (US); James A. Stevens, Lucas, TX (US); Dana K. Williamson, Garland, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 430 days.

(21) Appl. No.: 12/220,602

(22) Filed: Jul. 25, 2008

(51) Int. Cl.
*G01S 5/02* (2010.01)
(52) U.S. Cl. .......................... 342/424; 342/442
(58) Field of Classification Search .................. 342/423, 342/424, 432
See application file for complete search history.

(56) References Cited

U.S. PATENT DOCUMENTS

| | | | | |
|---|---|---|---|---|
| 3,935,574 A * | 1/1976 | Pentheroudakis | ............ | 342/424 |
| 4,794,395 A * | 12/1988 | Cindrich et al. | ............... | 342/424 |
| 5,477,230 A * | 12/1995 | Tsui | .............................. | 342/442 |
| 6,313,795 B1 * | 11/2001 | Herrmann et al. | ............. | 342/442 |
| 7,545,325 B1 * | 6/2009 | Nelson et al. | ................. | 342/387 |

* cited by examiner

*Primary Examiner* — Gregory C Issing
(74) *Attorney, Agent, or Firm* — Matthew J. Evans; Daniel M. Barbieri

(57) ABSTRACT

A method of integrating a detected signal along a given angle of arrival to improve detection. The method includes receiving the signal at a first antenna, receiving the signal at a second antenna, generating a phase difference trajectory based on the signal from the first antenna and the signal from the second antenna, and extracting a signal by integrating the phase difference trajectory over frequency for a plurality of angles of arrival.

20 Claims, 7 Drawing Sheets

SYSTEM AND METHOD FOR SIGNAL EXTRACTION AND ANGLE OF ARRIVAL DETERMINATION

BACKGROUND

The present invention relates generally to the field of systems and methods for signal detection. More particularly, the present invention relates to a system and method for very low signal to noise ratio signal extraction for spread spectrum signals based on an angle of arrival of the signals.

This application has particular application in SIGINT, COMINT, and ELINT applications where it is desirable to detect a spread spectrum signal and to determine its angle-of-arrival without requiring a priori information concerning the signal.

SIGINT is intelligence-gathering by interception of signals, whether between people (i.e., COMINT or communications intelligence) or between machines (i.e., ELINT or electronic intelligence), or mixtures of the two. Communications intelligence (COMINT) is a sub-category of signals intelligence that engages in dealing with messages or voice information derived from the interception of foreign communications. Electronic signals intelligence (ELINT) is intelligence gathering by use of electronic sensors.

The data that is available from SIGINT may reveal information about an opponent's defense network, especially the electronic parts such as radars, surface-to-air missile systems, aircraft, etc. SIGINT can be used to detect ships and aircraft by their radar and other electromagnetic radiation. SIGINT can be collected from ground stations near the opponent's territory, ships off their coast, aircraft near or in their airspace, or by satellite.

In addition to the content of signals, SIGINT provides information based on both type of electronic transmission and its originating location. Triangulation and more sophisticated radiolocation techniques, such as time of arrival methods, require multiple receiving points at different locations. These receivers send location-relevant information to a central point, or perhaps to a distributed system in which all participate, such that the information can be correlated and a location computed.

Phase interferometry is the technique of using the pattern of interference created by the superposition of two or more waves to diagnose the properties of the aforementioned waves. A phase interferometer may be used to provide precise angle-of-arrival information for radio frequency (RF) signals of interest.

However, spread spectrum signals are often difficult to detect by traditional direction finding techniques since the signal to noise ratio (SNR) at any given time, and at any given frequency, can be very low or even negative. What is needed is a system and method for signal extraction based on their angle of arrival, independent of the signals frequency and modulation phase agility, and at very low signal-to-noise ratios. What is further needed is such a system and method where no apriori information about the signal(s) is required.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a method of integrating a detected signal along a given angle of arrival to improve detection. The method includes receiving the signal at a first antenna, receiving the signal at a second antenna, generating a phase difference trajectory based on the signal from the first antenna and the signal from the second antenna, and extracting a signal by integrating the phase difference trajectory over frequency for a plurality of angles of arrival.

Another embodiment of the invention relates to a system for integrating a detected signal along a given angle of arrival to improve detection. The system includes a first radio frequency receiver configured to receive the detected signal at a first antenna, a second radio frequency receiver configured to receive the detected signal at a second antenna, an interferometer configured to generate a phase difference trajectory based on the signal from the first antenna and the signal from the second antenna, and a helical integrator configured to extract a signal by integrating the phase difference trajectory over frequency for a plurality of angles of arrival.

Yet another embodiment of the invention relates to a method of integrating a detected signal along a given angle of arrival to improve detection. The method includes receiving the signal at a first antenna and receiving the signal at a second antenna. The method further includes applying an IF selectivity filter to the received signal, generating a fast Fourier transform of a plurality of instances of the received signal, and generating an average of a plurality of consecutive fast Fourier transform points to generate an averaged signal. The method yet further includes generating a phase difference trajectory based on the averaged signal from the first antenna and the signal from the second antenna and identifying an angle of arrival for the averaged signal by integrating the phase difference trajectory over frequency for a plurality of angles of arrival.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
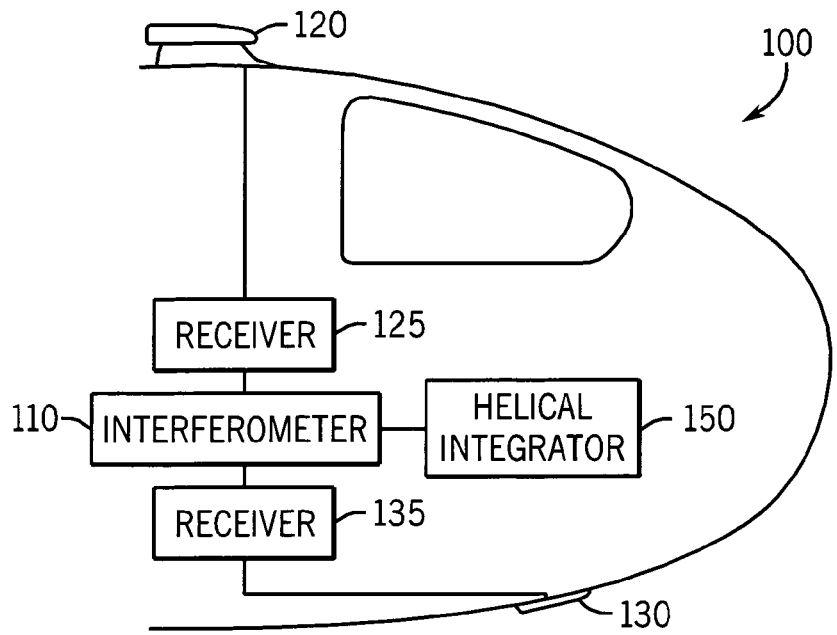
FIG. 1 is an aircraft having an onboard interferometer including first and second antennae, each antenna coupled to an associated receiver, according to an exemplary embodiment.

Before describing in detail the particular improved system and method, it should be observed that the invention includes, but is not limited to, a novel structural combination of conventional data/signal processing components and communications hardware and software, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft 100 having an onboard interferometer 110 including first and second antennae 120 and 130, each antenna coupled to an associated receiver 125 and 135, respectively, is shown, according to an exemplary embodiment. Advantageously, using the system described herein, only two antenna and two RF front-end receivers are needed to resolve the phase ambiguity created when the antenna are widely spaced relative to the wavelength of the signals being measured. Although only two antenna and receivers are described, it should be understood that the interferometer direction finding may be performed using multiple antennae using the methods and system described herein. Further, although antennas 120 and 130 are shown as aircraft mounted antennae, it should be understood that the antenna may be terrestrial based, within portable devices such a software defined radios, etc.

Although shown and described above with reference to a single aircraft, interferometer 110 could also be implemented by multiple aircraft with single antennas forming a networked interferometer between them. Accordingly, interferometer 110 may be implemented as a stand-alone signal detection unit or as part of a network of sensors. Further, although shown according to a specific embodiment, interferometer 110 may alternatively be configured to include more, fewer, and/or different components configured to implement functions described herein.

Interferometer 110 is configured to receive signal through antennas 120 and 130. The signals received may be frequency agile signals (e.g., frequency hopping and direct sequence spread spectrum, Costas coded radars, linear and non-linear FM signals, etc.) These signals are often difficult to detect by traditional direction finding techniques since the signal-to-noise ratio at any given time and at any given frequency, can be very low or even negative. Accordingly, interferometer 110 may be configured to utilize helical integrator 150 to perform signal extraction based on the signals angle of arrival, independent of frequency and modulation phase agility and at very low signal-to-noise ratios. No a priori information about the signal(s) is required.

Helical integrator 150 may be configured to mimic the phase difference trajectory that an arriving signal makes between antennas 120 and 130 over frequency. This phase trajectory has an angular acceleration that is unambiguous over $-\pi/2 \leq a \leq \pi/2$, where $\alpha$ is the angle of arrival of the signal with respect to the baseline formed by antennas 120 and 130. The incoming signal's phase difference between antennas 120 and 130 is integrated with a Helix that is matched to a phase trajectory corresponding to each possible $\alpha$. Helical integrator 150 may be configured to implement the above described integration using a variety of computational processors, including, but not limited to, FPGAs, ASICs, DSPs, GPPs.

Figure 2:
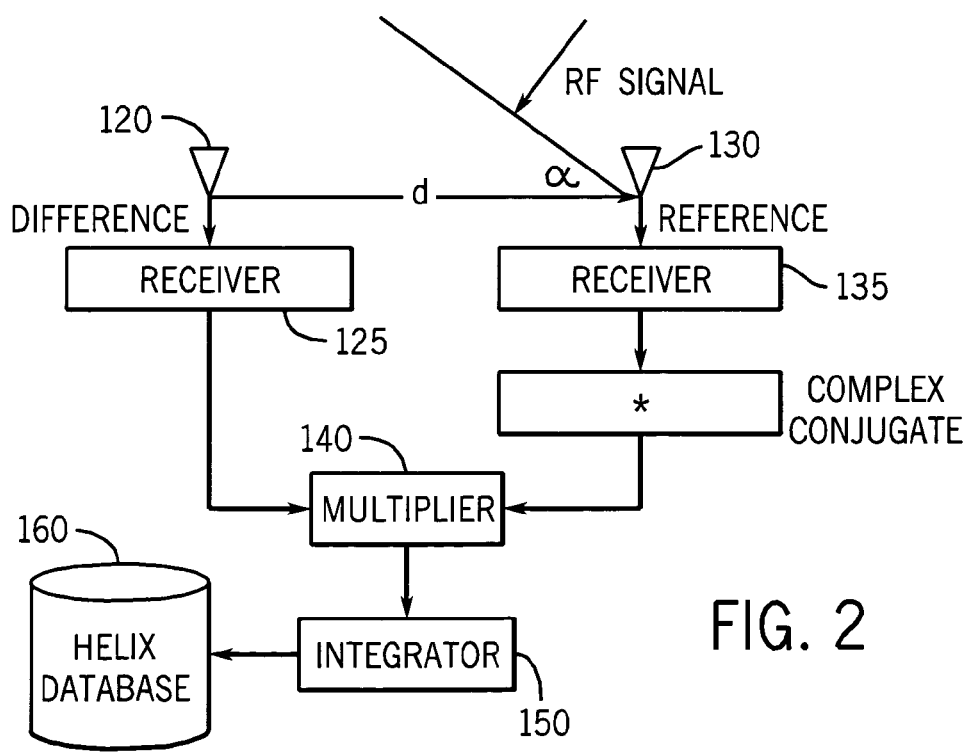
FIG. 2 is the antennas, receivers, a multiplier, and a helical integrator of the interferometer of FIG. 1 shown in schematic form, receiving signals from a remote transmission source at an angle-of-arrival of a and the two antenna are separated by interferometer baseline d (representing the distance between the two antenna), according to an exemplary embodiment.

Referring now to FIG. 2, antenna 120 and 130, receivers 125 and 135, a multiplier 140, and a helical integrator 150 of interferometer 110 receiving signals from a remote transmission source at an angle-of-arrival of $\alpha$ and the two antenna are separated by interferometer baseline d (representing the distance between the two antenna) are shown in schematic form, according to an exemplary embodiment. Helical integrator 150 may be configured to mimic a phase difference trajectory by generating a plurality of hypothesis helixes and comparing the helix of the received signal to the hypothesis helixes.

Interferometer 110 further includes a database of helixes 160, where each helix is associated with a particular angle of arrival between antennas 120 and 130. The helixes may be generated by integrator 150 during an initialization of interferometer 110.

Figure 3:
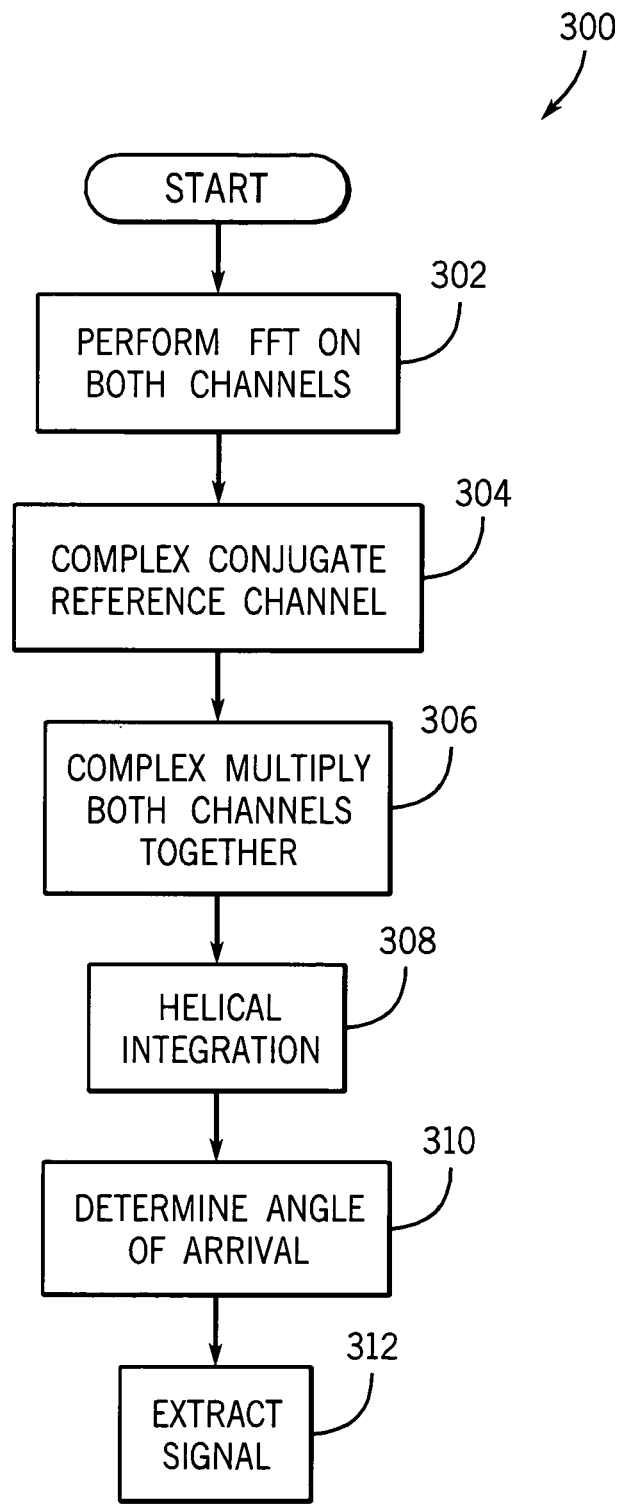
FIG. 3 is a flowchart illustrating a method for extracted signal integrated over the phase difference trajectory along the detected angle of arrival, according to an exemplary embodiment.

Referring now to FIG. 3, a flowchart 300 illustrating a method for extracted signal integrated over the phase difference trajectory along the detected angle of arrival is shown, according to an exemplary embodiment. The method of flowchart 300 may be implemented during a signal detection and analysis process. One of ordinary skill in the art would understand that although flowchart 300 is shown and described herein as having a specific number of steps performed in a specific order, the method may be implemented using more, fewer, and/or a different ordering of steps to perform the functions described herein.

In a step 302, signal processing begins by using a Fast Fourier Transform on the incoming signal received and both of antennas 120 and 130 and receivers 125 and 135 to generate the discrete Fourier transform representing the frequency domain of the signal received separately on each antenna. Although described and shown herein as being processed using Fast Fourier transforms, the incoming signal may alternatively be processed used a number of other methods including, but not limited to, delay discriminators, an acousto-optic modulator or Bragg cell, etc.

A first channel may be designated as a reference channel, shown as antenna 130 and receiver 135 in FIG. 2. A second channel may be designated as a difference channel, shown as antenna 120 and receiver 125 in FIG. 2. The signal for the difference channel is given by the equation:

$$SD = A_D e^{j\left(\omega t + N_D 2\pi + 2\pi d \sin\frac{\alpha}{\lambda}\right)} \quad (1)$$

Although antenna 120 and receiver 125 are shown and described herein as the difference channel and antenna 130 and receiver 135 as the reference channel, it should be understood that these designation may be reversed dependent on which receiver path contains the complex conjugation. The receiver path containing the complex conjugation is referred to as the reference channel.

The resultant discrete Fourier transform on the reference channel may be transformed by complex conjugation in a step 304 such that the signal from the reference channel is given by the equation:

$$S_R = A_R e^{j(\omega t)} \quad (2)$$

In a step 306, the resultant equation from both channels may be complex multiplied together to generate a magnitude, represented by the equation:

$$S_{RD} = A_R A_D e^{j\left(N_D 2\pi + 2\pi d \sin\frac{\alpha}{\lambda}\right)} \quad (3)$$

and an angle giving the phase, represented by the equation:

$$\angle S_{RD} = \Phi_{RD} = N_D 2\pi + 2\pi d \sin\frac{\alpha}{\lambda} \quad (4)$$

where the term $N_D$ in equations 3 and 4 represents the number of times the phase signal has passed through $2\pi$ when passing from the reference channel to the difference channel. This term, as used herein, represents the phase ambiguity.

Figure 4:
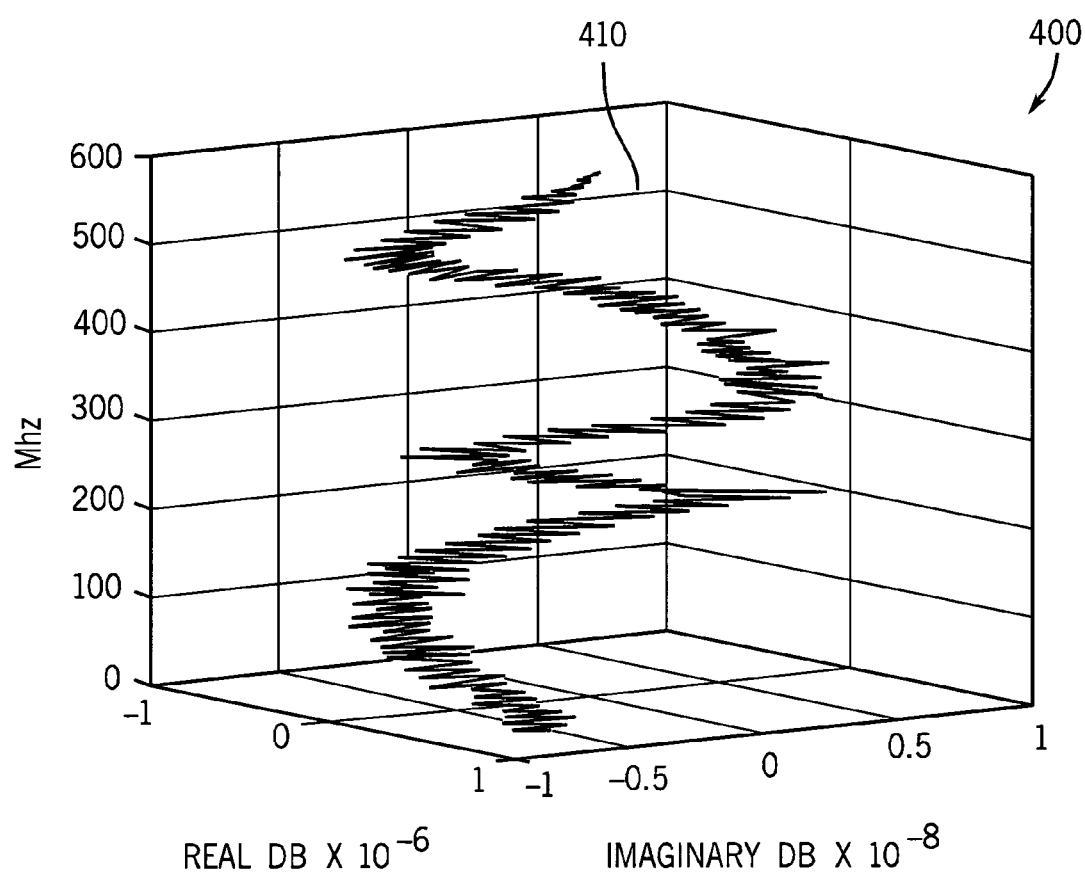
FIG. 4 is a three dimensional graph illustrating a helical plot of an equation for a signal having an angle of arrival of −0.80461 and an average acceleration of −0.00033527 rad/$(1/Fs)^2$, according to an exemplary embodiment.

Referring now to FIG. 4, a three dimensional graph 400 illustrating the helical plot of equation 3 for a signal having an angle of arrival of −0.80461 and an average acceleration of −0.00033527 rad/(1/Fs)² is shown, according to an exemplary embodiment. Graph 400 illustrates a helix 410 representing the incoming phase difference trajectory that is produced by multiplying the complex conjugated signal of the reference channel with the unconjugated signal of the difference channel.

Helical integrator 150 is defined as the integration over frequency for the phase difference trajectory over the angle-of-arrival a, between an interval of $-\pi/2 \leq \alpha \leq \pi/2$. This integration is represented by the equation:

$$\sum_{n=-\frac{N}{2}}^{\frac{N}{2}} \sum_{\lambda_0}^{\lambda_{N-1}} e^{-j\frac{2\pi d \sin\frac{\pi n}{N}}{\lambda}} \quad (5)$$

Figure 5:
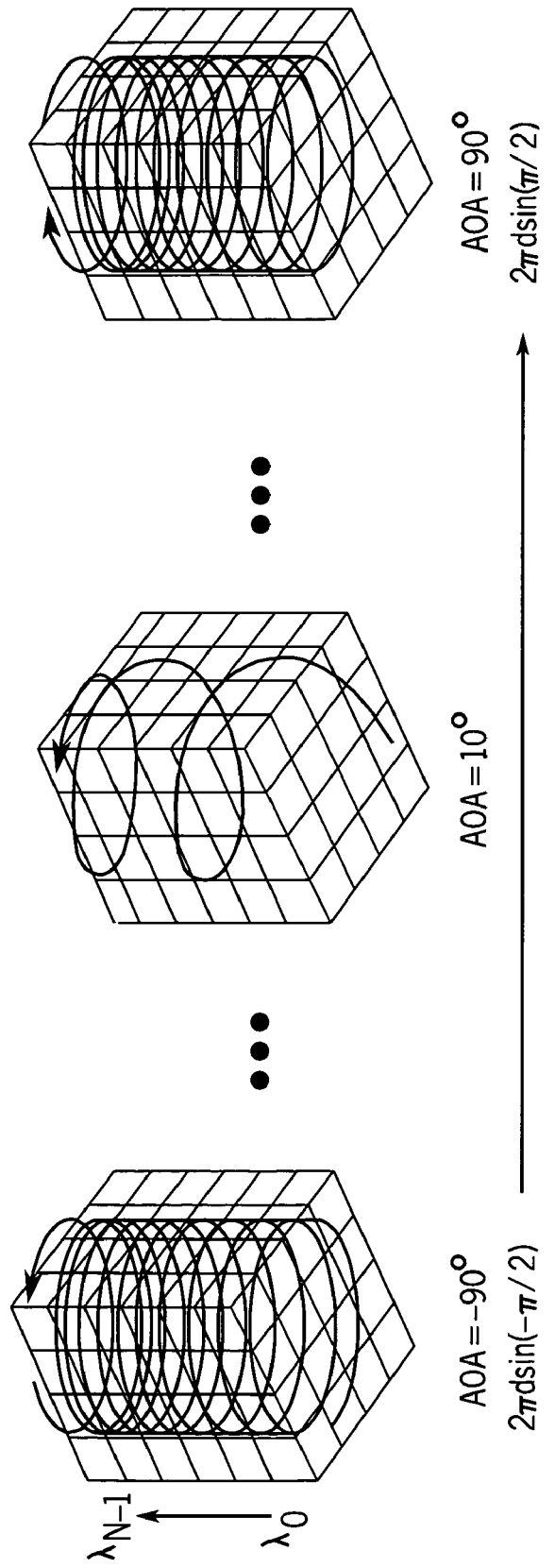
FIG. 5 is a set of helixes representing the phase differences over various angles of arrival, according to an exemplary embodiment.

Referring now to FIG. 5, a set of helixes 500 representing the phase differences over various angles of arrival is shown, according to an exemplary embodiment. As can be seen by FIG. 5, the tightness of the coil of each helix is a function of the angle of arrival. Further, the angle of the helix is dependent on whether the angle of arrival is left or right of the bore sight angle midway between antennas 120 and 130.

Integrating over a helical phase trajectory tends to integrate additive white Gaussian noise towards zero since it is uniformly distributed in phase, whereas a coherent signal, matching a specific phase trajectory will tend to integrate towards a positive magnitude. The Helix that most closely matches the angle of arrival will integrate to a peak indicating the best unambiguous estimate of the arrival angle. The incoming signal helix only has energy at those frequencies (z axis) where the signal is present. Therefore, the wider the incoming signal is dispersed in frequency or the more frequency agile it is, the more helix exists to integrate over and the larger the gain against noise. Accordingly, the wider or more frequency agile the signal is, the more accurately helical integrator 150 will be able to identify the angle of arrival.

Figure 6:
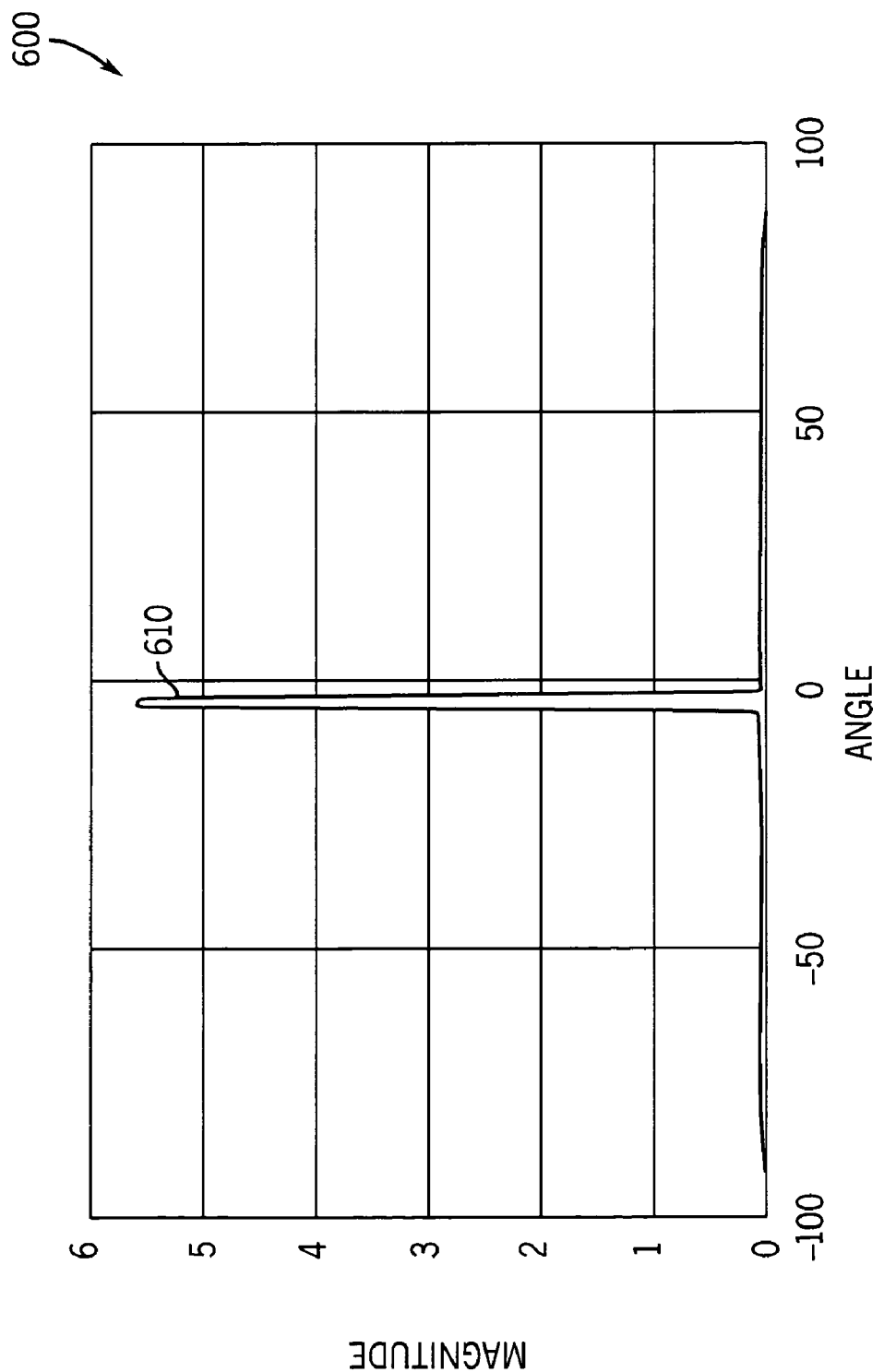
FIG. 6 is a graph of the magnitude of the normalized helical integrator output over the angles of arrival, according to an exemplary embodiment.

Referring again to FIG. 3, in a step 308, integrator 150 may be configured to apply equation 5 over the phase difference trajectory of the incoming signal according to the equation:

$$H(n) = \sum_{n=-\frac{N-1}{2}}^{\frac{N-1}{2}} \sum_{\lambda_0}^{\lambda_{N-1}} e^{-j\frac{2\pi d \sin\frac{\pi n}{N}}{\lambda}} S_{RD}(\lambda) \quad (6)$$

where $S_{RD}$ is the phase difference trajectory of the incoming signal. This equation integrates the incoming signal against the multiple helixes. Referring now to FIG. 6, a graph 600 of the magnitude of the normalized helical integrator output over the angles of arrival is shown, according to an exemplary embodiment. The Helix that corresponds to the incoming signals angle-of-arrival becomes a matched filter for the incoming signals phase difference trajectory over frequency. The peak 610 shows the detected angle of arrival for the incoming signal, provided as an output by helical integrator 150 in a step 310. The extracted signal integrated over the phase difference trajectory along the detected angle of arrival is provided in a step 312.

Figure 7A:
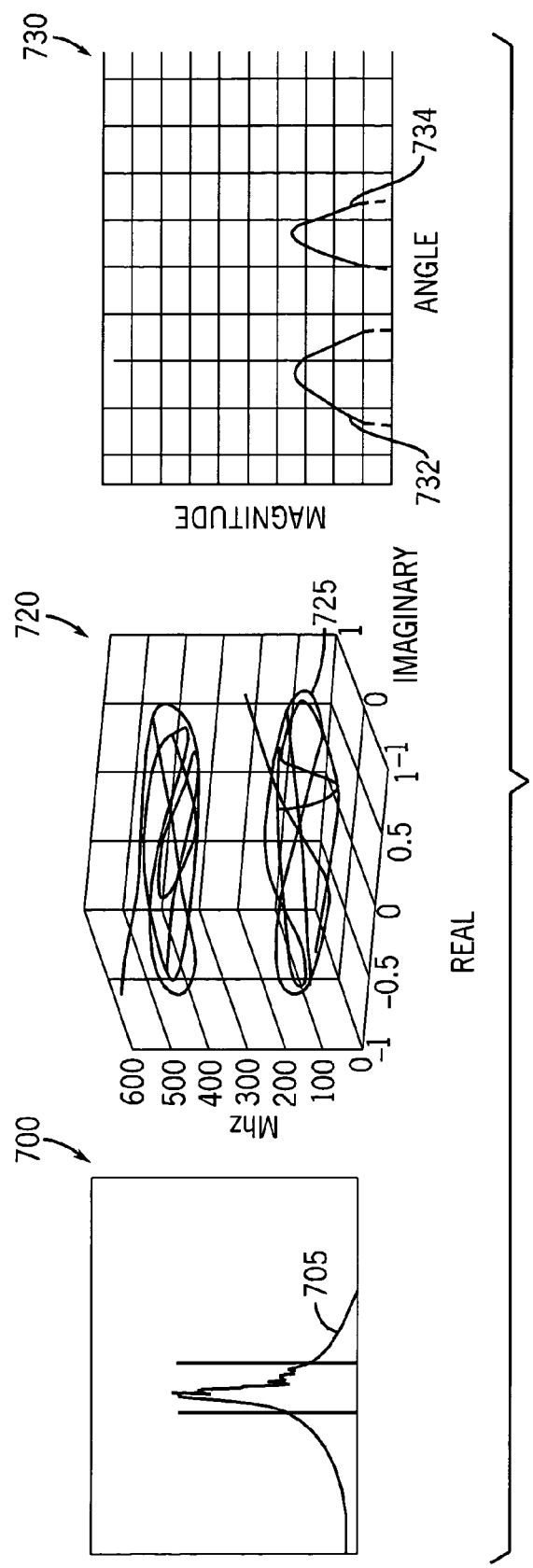
FIG. 7A is three graphs illustrating a received signal, the helix generated by the received signal, and the result of a helical integration, according to an exemplary embodiment.

Referring now to FIG. 7A, three graphs illustrating a received signal, the helix generated by the received signal, and the results of a helical integration are shown, according to an exemplary embodiment. A graph 700 showing a signal 705 that has been received on two different angles of arrival is shown. Graph 700 illustrates a direct signal arriving at an angle of arrival of −45 degrees. A multipath signal of equal magnitude is arriving at an angle of arrival of 15 degrees. A multipath signal is typically received where the incoming signal has bounced off objects such as mountains, buildings, etc. Graph 720 illustrates the incoming phase trajectories of direct and multipath signals in helixes 725 created by the incoming direct and reflected signals after digital averaging of 30 consecutive points prior to Helical integration. Graph 730 illustrates the normalized helical integrator output showing a direct signal output 732 at −45° and a multipath signal output 734 at 15°. The multi path signal is useful since it provide two different signals to be integrated up for detection using helical integrator 150.

Figure 7B:
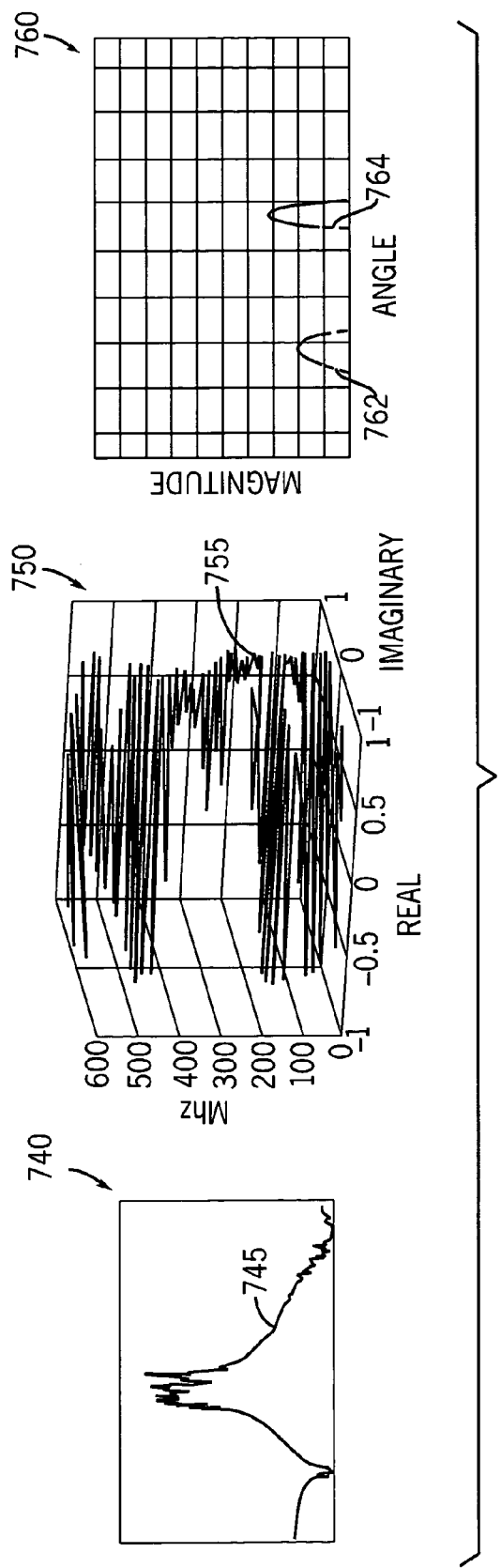
FIG. 7B is three graphs illustrating the received signal of FIG. 7A where noise has been introduce to the signal, the helix generated by the received signal, and the result of a helical integration, according to an exemplary embodiment.

Referring now to FIG. 7B, three graphs illustrating the received signal of FIG. 7A where noise has been introduce to the signal, the helix generated by the received signal, and the result of a helical integration are shown, according to an exemplary embodiment. In graph 740, signal 745 is the signal 705 from FIG. 7A where an input signal-to-noise ratio (following an IF selectivity filter) of −9 db is been introduced. As can be seen, the introduced noise disguises the received signal such that traditional interferometry techniques would not work to generate and angle of arrival. However, graph 750 illustrates that the incoming phase trajectories of direct and multipath signals are still detectable in helixes 755 created by the incoming direct and reflected signals after digital averaging of 30 consecutive points prior to Helical integration. Graph 760 illustrates that the normalized helical integrator output showing a direct signal output 762 at −45° and a multipath signal output 764 at 15° are still detectable. As shown in FIGS. 7A and 7B, the helical integration of the received signals can be used to extract the fundamental and multipath signal despite to low input signal-to-noise ratio.

Advantageously, helical integrator 150 allows extraction of frequency agile and low SNR signals with relatively low computational complexity allowing the method to be implemented on lower computational capable platforms such as software defined radios. The computation generates an unambiguous angle of arrival for each extracted signal, can separate direct signals from multipath even at equal magnitude, and can be used in conjunction with other direction finding techniques to augment signal extraction and direction finding for low probability of intercept/detection and low observable (i.e., weak) signals.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type and number of antenna us, the method in which frequency difference is used to resolved the phase ambiguity, the position of the antenna, etc. may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of integrating a detected signal along a given angle of arrival to improve detection, comprising:
    receiving the signal at a first antenna;
    receiving the signal at a second antenna;
    generating a phase difference trajectory based on the signal from the first antenna and the signal from the second antenna; and
    extracting a signal by integrating the phase difference trajectory over frequency for a plurality of angles of arrival.

2. The method of claim 1, wherein integrating the phase difference trajectory is a helical integration.

3. The method of claim 2, wherein integrating the phase difference trajectory over frequency for a plurality of angles of arrival includes integrating over a plurality of stored helixes, each helix associated with a unique angle of arrival.

4. The method of claim 1, wherein extracting a signal includes extracting both a direct signal and a multipath signal, each signal having a different angle of arrival.

5. The method of claim 1, further including generating a plurality of spectral lines based on a complex multiplication of a complex conjugation of the signal received at the first antenna and the signal received at the second antenna and determining that there are no spectral lines above a threshold value.

6. The method of claim 1, wherein the signal received at the first and second antenna is a frequency hopping signal.

7. The method of claim 1, wherein the signal received at the first and second antenna is a spread spectrum signal.

8. A system for integrating a detected signal along a given angle of arrival to improve detection, comprising:
    a first radio frequency receiver configured to receive the detected signal at a first antenna;
    a second radio frequency receiver configured to receive the detected signal at a second antenna;
    a interferometer configured to generate a phase difference trajectory based on the signal from the first antenna and the signal from the second antenna; and
    a helical integrator configured to extract a signal by integrating the phase difference trajectory over frequency for a plurality of angles of arrival.

9. The system of claim 8, wherein the integration of the phase difference trajectory is a helical integration.

10. The system of claim 8, wherein integrating the phase difference trajectory over frequency for a plurality of angles of arrival includes integrating over a plurality of stored helixes, each helix associated with a unique angle of arrival.

11. The system of claim 8, wherein extracting a signal includes extracting both a direct signal and a multipath signal, each signal having a different angle of arrival.

12. The system of claim 8, wherein the interferometer is further configured to generate a plurality of spectral lines based on a complex multiplication of a complex conjugation of the signal received at the first antenna and the signal received at the second antenna to determine whether there are any spectral lines above a threshold value.

13. The system of claim 8, wherein the helical integrator is configured to extract a signal based on a determination that there are no spectral lines above the threshold value.

14. The system of claim 8, wherein the signal received at the first and second antenna is a spread spectrum signal.

15. A method of integrating a detected signal along a given angle of arrival to improve detection, comprising:
    receiving the signal at a first antenna;
    receiving the signal at a second antenna;
    applying an IF selectivity filter to the received signal;
    generating a fast Fourier transform of a plurality of instances of the received signal;
    generating an average of a plurality of consecutive fast Fourier transform points to generate an averaged signal;
    generating a phase difference trajectory based on the averaged signal from the first antenna and the signal from the second antenna; and
    identifying an angle of arrival for the averaged signal by integrating the phase difference trajectory over frequency for a plurality of angles of arrival.

16. The method of claim 15, wherein integrating the phase difference trajectory is a helical integration.

17. The method of claim 16, wherein integrating the phase difference trajectory over frequency for a plurality of angles of arrival includes integrating over a plurality of stored helixes, each helix associated with a unique angle of arrival.

18. The method of claim 15, wherein extracting a signal includes extracting both a direct signal and a multipath signal, each signal having a different angle of arrival.

19. The method of claim 15, further including generating a plurality of spectral lines based on a complex multiplication of a complex conjugation of the signal received at the first antenna and the signal received at the second antenna and determining that there are no spectral lines above a threshold value.

20. The method of claim 15, wherein the signal received at the first and second antenna is a frequency hopping signal.

* * * * *